(12) United States Patent
Monroig, Jr.

(10) Patent No.: US 6,413,033 B1
(45) Date of Patent: Jul. 2, 2002

(54) CARGO CARRIER FOR VEHICLE

(76) Inventor: Jamie Monroig, Jr., 140 Sylvan Ave., Newark, NJ (US) 07104

( * ) Notice: Subject to any disclaimer, the term of this patent is extended or adjusted under 35 U.S.C. 154(b) by 0 days.

(21) Appl. No.: 09/480,562

(22) Filed: Jan. 10, 2000

(51) Int. Cl.[7] .............................. B60P 1/16; B60P 1/30
(52) U.S. Cl. ...................... 414/480; 414/462; 414/477; 414/538
(58) Field of Search ................................ 414/462, 477, 414/478, 480, 494, 500, 538

(56) References Cited

U.S. PATENT DOCUMENTS

| | | | | |
|---|---|---|---|---|
| 2,745,566 A | * | 5/1956 | Bouffard | 414/494 |
| 2,823,818 A | * | 2/1958 | Chastain et al. | 414/494 |
| 3,957,166 A | * | 5/1976 | Durham | 414/500 |
| 3,964,626 A | * | 6/1976 | Arregui | 414/50 |
| 3,987,918 A | * | 10/1976 | Corompt | 414/500 |
| 4,274,788 A | * | 6/1981 | Sutton | 414/462 |
| 5,090,335 A | * | 2/1992 | Russell | 414/522 |
| 5,232,329 A | | 8/1993 | Livingston | 414/494 |
| 5,249,910 A | | 10/1993 | Ball | 414/538 |
| 5,380,141 A | | 1/1995 | Flowers | 414/462 |
| 5,511,928 A | | 4/1996 | Ellis | 414/462 |
| 5,556,249 A | * | 9/1996 | Heine | 414/477 |
| 5,603,600 A | | 2/1997 | Egan et al. | 414/462 |
| 5,620,296 A | | 4/1997 | McMahon et al. | 414/498 |
| 5,829,945 A | * | 11/1998 | Stanley | 414/477 |
| 5,846,047 A | | 12/1998 | Riekki | 414/494 |
| 6,099,232 A | * | 8/2000 | Dixon et al. | 414/538 |
| 6,176,672 B1 | * | 1/2001 | Egan et al. | 414/462 |

FOREIGN PATENT DOCUMENTS

| | | | | |
|---|---|---|---|---|
| DE | 2422109 | * | 11/1975 | 414/494 |
| EP | 2056 | * | 5/1979 | 414/494 |
| EP | 362096 | * | 4/1990 | 414/478 |
| EP | 449217 | * | 10/1991 | 414/477 |
| GB | 1234147 | * | 6/1971 | 414/477 |

* cited by examiner

Primary Examiner—James W. Keenan
(74) Attorney, Agent, or Firm—Thomas L. Adams

(57) ABSTRACT

A carrier adapted for mounting on a vehicle bed can carry cargo. The carrier has a stationary support mounted on the vehicle bed. The carrier also has an articulated support and a cargo support. The articulated support has a proximal end pivotally mounted on the stationary support. Also included is an elevation device coupled to the articulated support at an upper joint and to the stationary support at a lower joint for articulating the articulated support. The upper joint is further from the proximal end than the lower joint. The cargo support is mounted for longitudinal motion on the articulated support. The cargo support is operable to detach and reattach to the articulated support at a handoff location located at the proximal end of the articulated support. The carrier also has a motive device for moving the cargo support. This motive device includes a guide mechanism located at the handoff location for vertically translating and supporting an end of the cargo support from the handoff location.

32 Claims, 8 Drawing Sheets

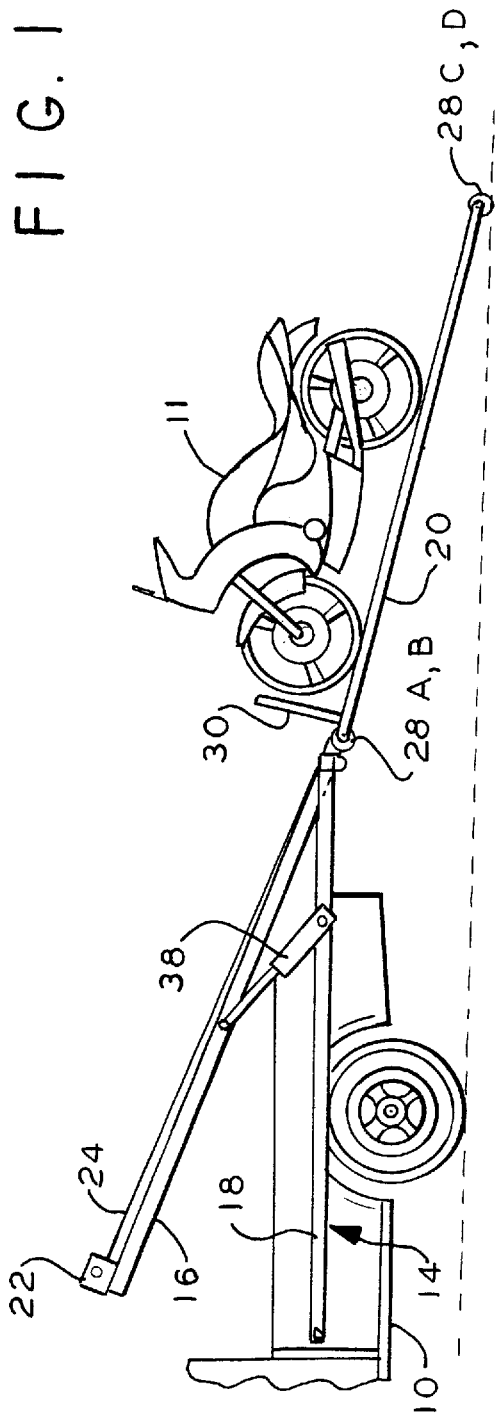
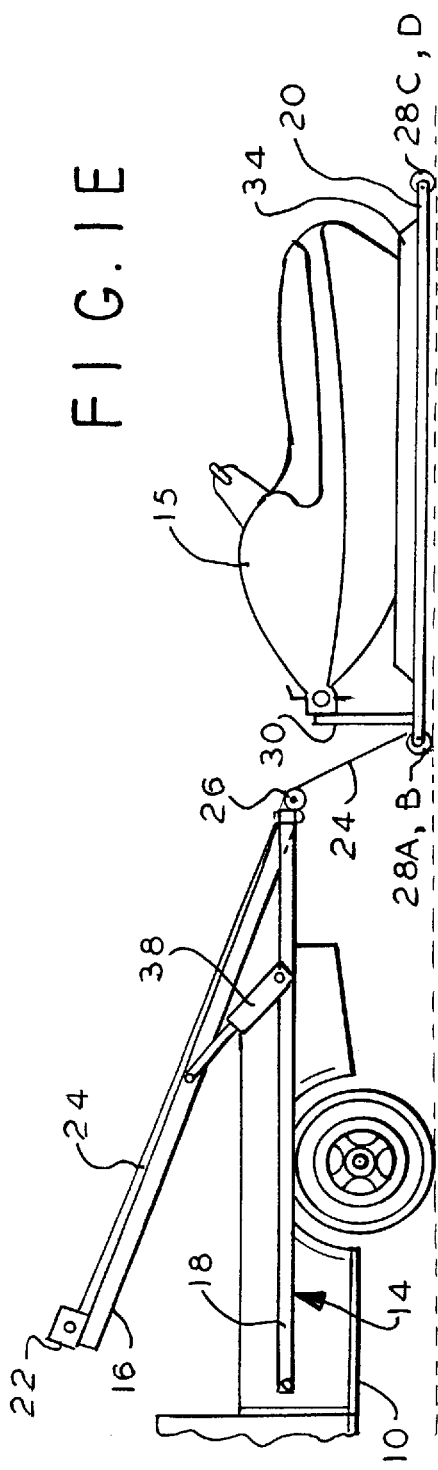

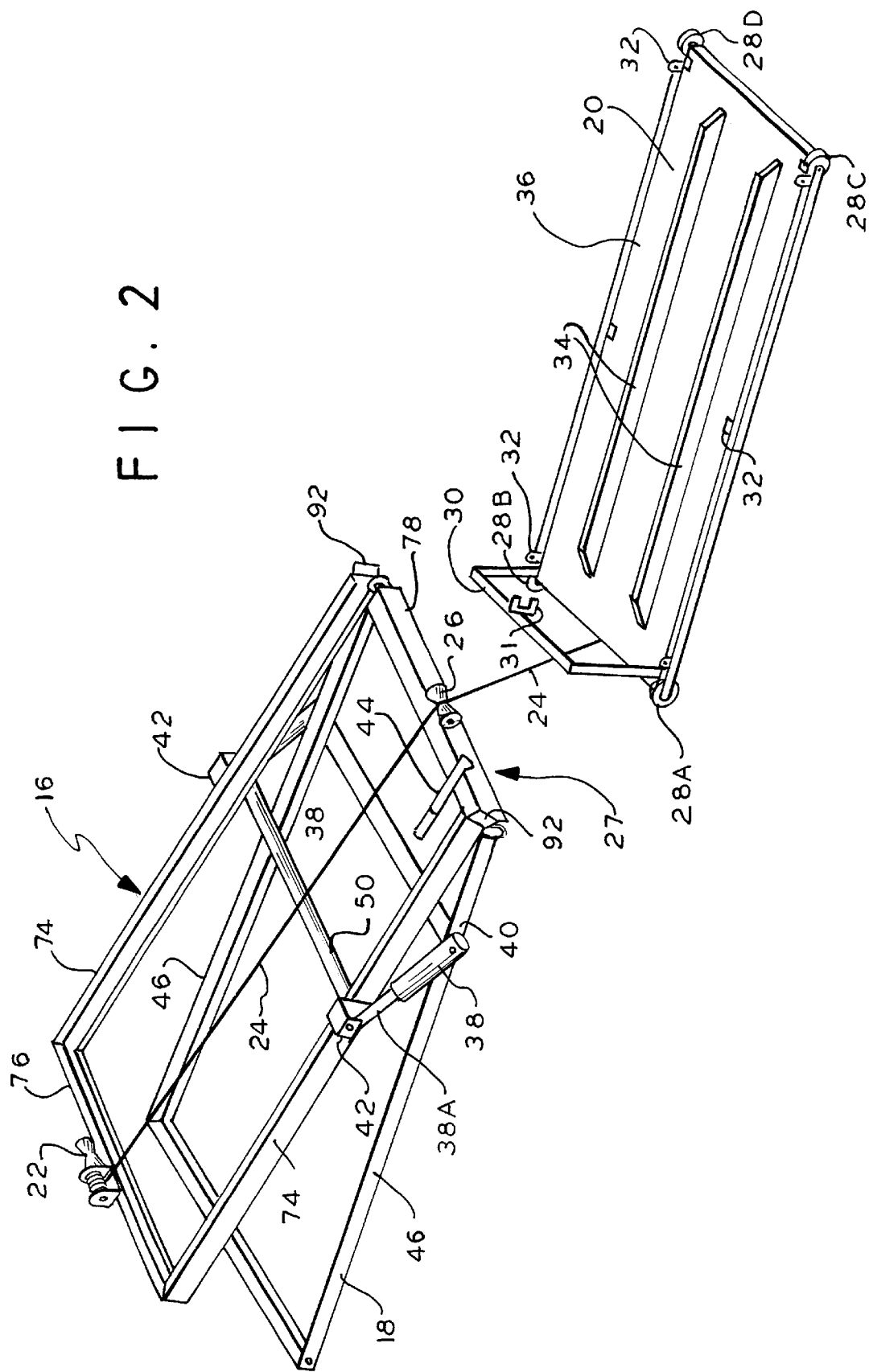

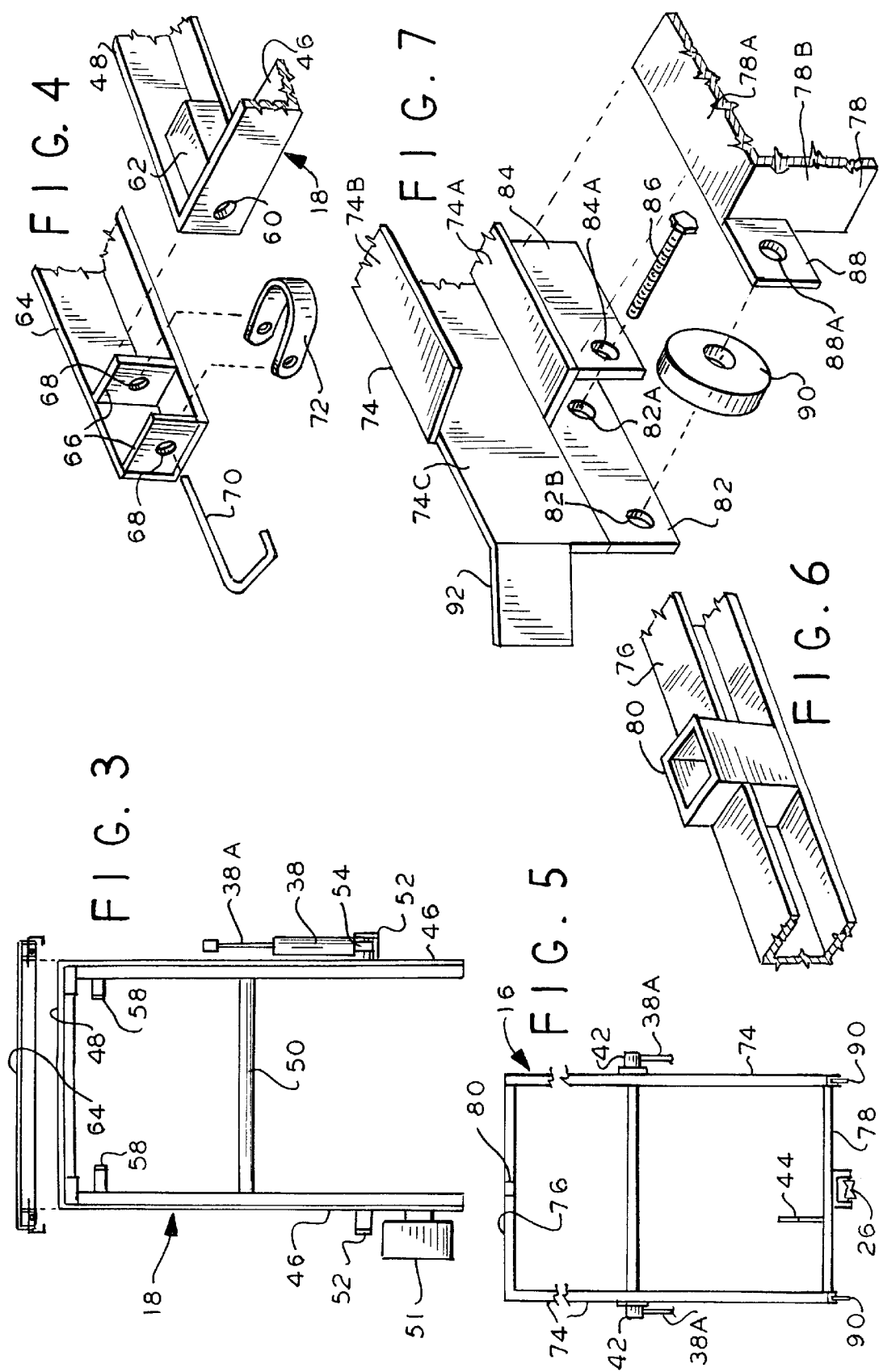

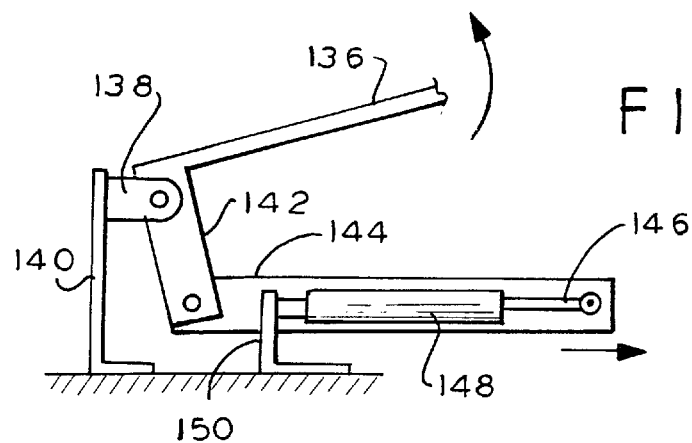
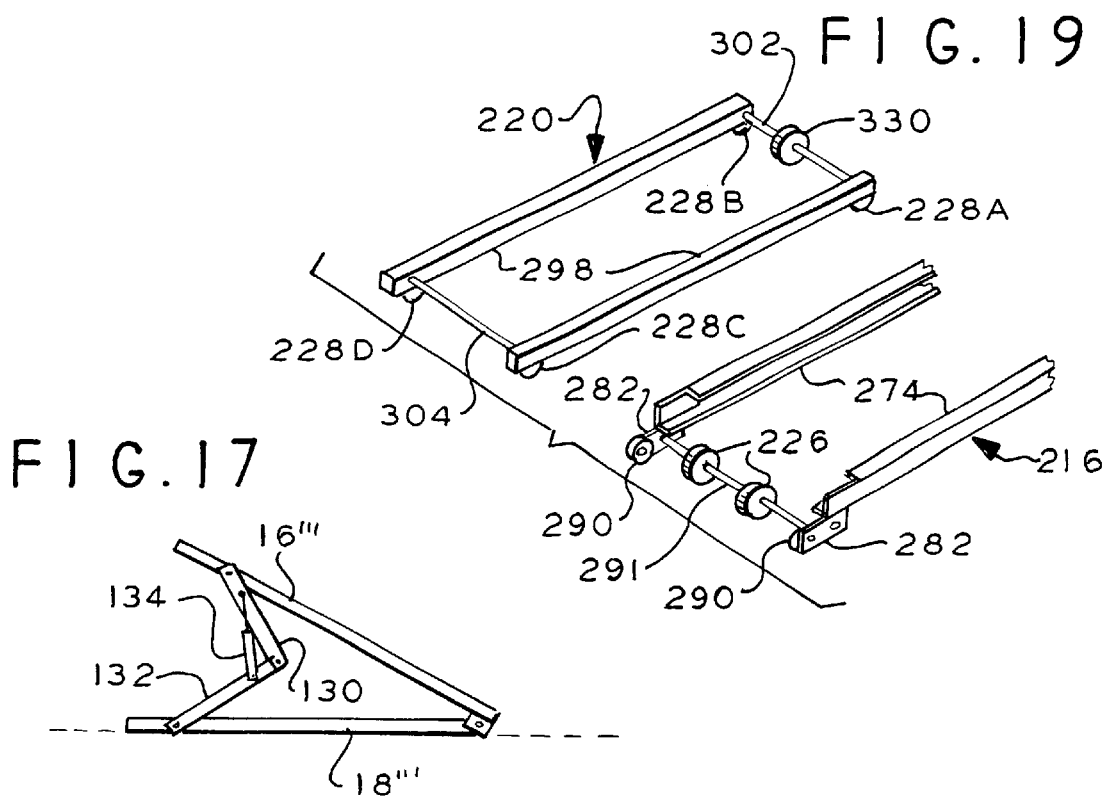
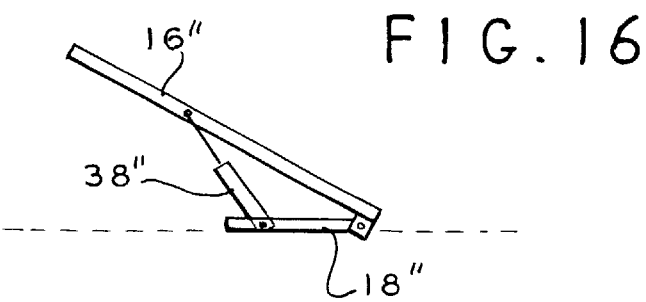

CARGO CARRIER FOR VEHICLE

BACKGROUND OF THE INVENTION

1. Field of the Invention

The present invention relates to apparatus for transporting cargo, and in particular, to a device having a cargo support that can be articulated before unloading the cargo.

2. Description of Related Art

People often wish to transport equipment such as motorcycles or personal water craft with small trucks such as pickup trucks. A serious difficulty is lifting such equipment onto the truck bed. U.S. Pat. No. 5,249,910 proposes using a winch to load and unload cargo over a ramp. A ramp may be inappropriate for unloading equipment such as a personal water craft onto land. First, significant effort is required to push the craft horizontally across the truck bed and onto the ramp. Once on the ramp, one end of the craft can be brought to the ground, but must then be lifted and pulled out to allow the rest of the craft to descend the ramp. Alternatively, the truck can be moved forward as the craft completes its descent on the ramp, but this procedure is complicated and will normally require two operators. Also, loading can be difficult because the craft must pass the crest of the ramp and rapidly change its angle of elevation, before becoming horizontal on the truck bed. The rocking occurring at this transition also means that the full weight of the craft is supported essentially at a single point, which runs the risk of applying excessive pressure and damaging the hull.

Commercially available trucks for hauling vehicles include a platform that tilts before being slid backwardly to reach the ground and form a ramp. The cargo must still make the transition from the ground onto the ramp, which is not difficult with wheeled vehicles, but can be difficult with other cargo such as water craft. More importantly, this technology requires that the truck be dedicated to hauling vehicles and is therefore impractical for users who may wish to use their truck other purposes. U.S. Pat. No. 5,511,928 shows a boat hauling accessory that can be placed on an ordinary pickup truck, but has a platform that always stays tilted, so that the forward end remains high over the truck cab while traveling. Also, this arrangement does not solve the problem of moving the cargo from the ground to the platform. See U.S. Pat. No. 5,846,047 for a tilting platform that does not slide longitudinally.

In U.S. Pat. No. 5,603,600 a ramp is formed of two telescoping sections. Cargo can be loaded on one section of the ramp, which then slides upon the other section to lift the cargo up over the truck bed. The collapsed ramp then pivots into a horizontal position. This device does not solve the problem of lifting the cargo onto or off the ramp. Also, this device keeps the cargo high off the truck bed, apparently to accommodate the mechanism that rotates the ramp. Such a configuration, however, raises the center of gravity, and reduces the stability of the truck and its cargo.

In U.S. Pat. No. 5,380,141 a similar arrangement is shown where the first section deployed does not support the cargo, but is positioned behind the truck and supported by a separate vertical support member. Thereafter, the section carrying the cargo is slid over the already deployed member, and then both members can be tilted to form a ramp. This arrangement has the same difficulty with loading/unloading the cargo from/to the ground and also keeps the cargo high and therefore degrades stability.

In U.S. Pat. No. 5,232,329 one end of a detachable platform can be lifted by a cable suspended over a boom whose angle of elevation is controlled by a hydraulic cylinder. The boom is then swung from an obtuse angle to an acute angle to allow the detachable platform to ride up the boom. Swinging the boom through such a large angle requires a relatively long hydraulic cylinder, and for this reason, the boom and cargo remains high off the truck bed after loading. See also U.S. Pat. No. 5,620,296 for another boom arrangement.

Accordingly, there is in need for a cargo carrier that can be mounted on a vehicle bed and which simplifies the process of loading and unloading cargo.

SUMMARY OF THE INVENTION

In accordance with the illustrative embodiments demonstrating features and advantages of the present invention, there is provided a carrier adapted for mounting in a vehicle bed for carrying cargo. The carrier has a stationary support mounted on the vehicle bed. Also included is an articulated support and a cargo support. The articulated support has a proximal end pivotally mounted on the stationary support. The carrier also has an elevation means for articulating the articulated support. The cargo support is mounted for longitudinal motion on the articulated support. The cargo support is operable to detach and reattach to the articulated support at a handoff location located at the proximal end of the articulated support. The carrier also has a motive means for moving the cargo support. This motive means includes a guide means located at the handoff location for vertically translating and supporting an end of the cargo support from the handoff location.

In accordance with another aspect of the invention there is provided, a carrier adapted for mounting in a vehicle bed for carrying cargo. The carrier has a stationary support and an articulated support. The stationary support is mounted on the vehicle bed. The articulated support has a proximal end pivotally mounted on the stationary support. Also included is an elevation means coupled to the articulated support at an upper joint and to the stationary support at a lower joint for articulating the articulated support. The upper joint is further from the proximal end than the lower joint. The carrier also has a cargo support mounted for longitudinal motion on the articulated support. The cargo support is operable to detach and reattach to the articulated support at a handoff location located at the proximal end of the articulated support. The carrier also has a motive means for moving the cargo support.

By employing apparatus of the foregoing type, an improved cargo carrier is achieved. In a preferred embodiment, the cargo can be placed on a cargo support formed as a platform having casters at its four corners. This cargo platform can roll in channels of a preferred articulated support. These channels also have rollers at their back end. The angle of elevation of this articulated support can be altered by a hydraulic cylinder. This hydraulic cylinder connects below to a location that is relatively close to the pivot point of the articulated support (in comparison to the connection point of the cylinder to the articulated support itself). This relative placement of the hydraulic cylinder allows it to collapse into a nearly horizontal position, so that the cargo platform can descend to a position close to the truck bed in order to provide a low center of gravity and better stability. This role to placement also reduces the force and stresses placed on the articulated support.

In this preferred embodiment, the cargo platform can extend from the channels of the articulated support, and detach therefrom as the leading edge of the cargo platform touches the ground. Preferably, the descent is controlled by a winch-driven cable, which cable eventually rides over a sheave to lower the trailing edge of the detached cargo platform to the ground. Detachment of the cargo platform is facilitated by a hand lever located near the sheave. This lever can be used to lift the trailing edge of the cargo platform over the sheave and other parts of the articulated support.

In one highly preferred embodiment, the assembly can be detached from the truck bed using quick-release pins. Support legs can then be deployed to support the back end of the assembly. The assembly can then be partially unloaded from the truck bed before additional support legs on the forward end of the assembly are deployed to then allow complete unloading.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein:

FIG. 1D shows the cargo support of FIG. 1C just detached from the main assembly;

FIG. 1E shows the cargo support of FIG. 1D lowered to the ground and with alternate cargo, namely, a personal water craft;

FIG. 2 is a perspective view of the carrier of FIG. 1E;

FIG. 3 is a plan view of the stationary support for the carrier of FIG. 2;

FIG. 4 is an exploded, detailed perspective view of an inside corner of the support of FIG. 3;

FIG. 5 is a plan view of the articulated support of the carrier of FIG. 2;

FIG. 6 is a fragmentary, detailed perspective view of the center of the distal edge of the support of FIG. 5;

FIG. 7 is an exploded, detailed perspective view of the left proximal corner of the support of FIG. 5;

FIG. 16 is a schematic illustration of an elevation means that is an alternate to that of FIG. 2;

FIG. 17 is a schematic illustration of an elevation means that is an alternate to that of FIG. 2;

FIG. 18 is a schematic illustration of an elevation means that is an alternate to that of FIG. 2; and FIG. 19 is an exploded, perspective view of an articulated support and cargo support that is an alternate to that of FIG. 2.

DETAILED DESCRIPTION OF THE PREFERRED EMBODIMENTS

Figure 1A:
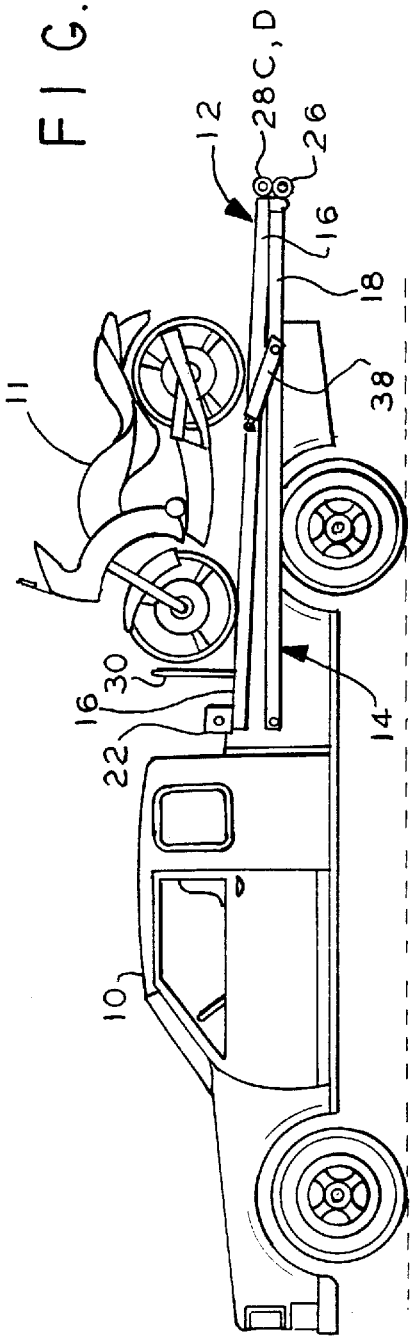
FIG. 1A is a side elevational view of a carrier in accordance with principles of the present invention, mounted on a vehicle and carrying cargo in the form of a motorcycle.

Referring to FIGS. 1A and 2, a vehicle 10 is shown supporting the carrier 12 on its bed 14. The carrier has an articulated support 16 pivotally mounted on its proximal end to a stationary support 18. Articulated support 16 has along its sides a pair of C-shaped channels 74 arranged to receive cargo support 20. A motive means 22, shown as a winch, is mounted in the center of the distal member 76 of articulated support 16 to act as a hoist means. Hoist means 22 can play out and rewind cable 24 (also referred to as a flexible link).

In FIG. 2 cargo support 20 is shown detached from articulated support 16 and coming to rest on the ground. Accordingly, cable 24 is shown passing over sheave 26, which acts as a guide means located in a handoff location 27. Cargo support 20 is shown with four casters 28A–28D at its four corners. The vertical posts of hitching fence 30 are inserted into sockets (shown hereinafter) at the forward corners of cargo support 20. The six tie-down cleats 32 are provided along the outside edges of support 20 for securing cargo. Also, a pair of optional longitudinal ribs 34 are mounted atop panel 36 to support, for example, the hull of a personal water craft (shown hereinafter).

An elevation means is shown herein as a pair of hydraulic cylinders 38, each connected between stationary support 18 and articulated support 16. The lower end of the elevation means 38 is connected to a lower joint 40 that is closer to the proximal end of support 16 than the upper joint 42 on the articulated support 16. This offset between the upper and lower joints 40, 42 enable the articulated support 16 to descend to a position contiguous to stationary support 18, at which time the elevation means 38 forms a relatively shallow angle of less than 10° with respect to horizontal. This enables the cargo to ride at a relatively low position, which keeps the center of gravity of the vehicle low to enhance stability. As described further hereinafter, this offset also reduces the stress on articulated support 16.

As described further hereinafter, the detachment of cargo support 20 from articulated support 16 will be assisted by lever 44, which acts as a lift means to boost the forward edge of cargo support 16 over sheave 26.

Referring to FIGS. 3 and 4, stationary support 18 is shown with a longitudinally oriented pair of angle irons 46 welded at their forward ends to a similar, transverse angle iron 48. Welded between the mid sections of angle irons 46 is a flat metal brace 50. An electrically powered hydraulic pump 51 is shown attached to the side of one of the angle irons 46 to provide hydraulic pressure to the cylinders 38. An L-shaped bracket 52 is welded to the outside of angle irons 46. The knuckle 54 of hydraulic cylinder 38 is pinned between bracket 52 and angle iron 46.

An L-shaped bracket 58 is welded to the inside edge of angle irons 46 near their forward ends. Bracket 58 presents a hook-like projection that can interlock with the previously mentioned cargo support to act as an interlock means for holding that cargo support in place when lowered.

Each of the forward ends of angle irons 46 has a support hole 60 that communicates into a box-like shield 62 attached to the inside corner of angle iron 48. Angle iron 48 can fit into the inside corner of a bracket 64, shown herein as an angle iron. A spaced pair of walls 66 are welded transversely to bracket 64. Each of the walls 66 has a bracket hole 68, aligned to receive locking pin 70. Between walls 66, pin 70 is fitted through holes in the arms of U-shaped leaf spring 72, with the inner arm of spring 72 affixed to a mid point of pin 70 in order to inwardly bias the pin toward support hole 60. Accordingly, the pins 70 can be withdrawn and the J-shaped outer handle of pins 70 turned into a position that keeps each pin withdrawn. Stationary support 18 can then be positioned with its support hole 60 aligned with bracket holes 68. Thereafter, pins 70 can be released to lock support 18 onto bracket 64. Of course, the procedure can be reversed when support 18 must be removed from bracket 64.

Referring to FIGS. 5 and 6, articulated support 16 is shown with two parallel, longitudinally extending, C-shaped channels 74. The distal ends of channels 74 are interconnected by a transverse channel 76, while their proximal ends are interconnected by angle iron 78. Welded into a cut-out in one of the branches of channel 76 (FIG. 6) is a short box extrusion 80 that acts as a socket for supporting the previously mentioned winch.

Figure 8:
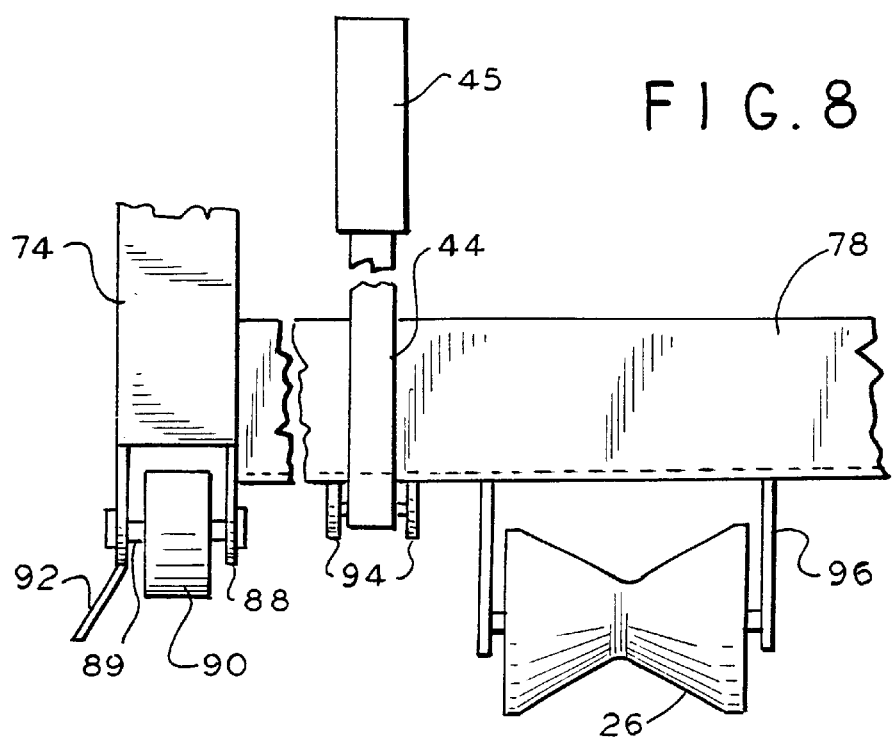
FIG. 8 is a fragmentary, detailed plan view of a portion of the proximal edge of the support of FIG. 5.
Figure 9:
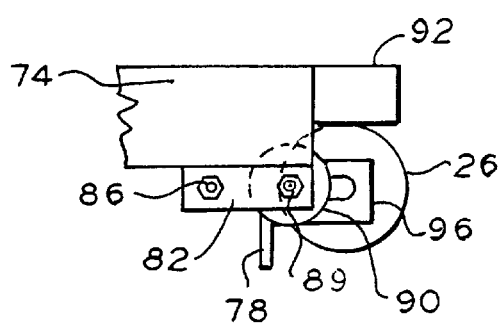
FIG. 9 is a detailed elevational view of the proximal end of the arrangement of FIG. 7.

Referring to FIGS. 7–9, both branches 74A and 74B of channel 74 are shown cut back at the proximal end. A distal portion of the end of the horizontal branch 78A of angle iron 78 is butt-welded to the inside edge of the lower branch 74A of channel 74. A vertical journal plate 82 is welded to the lower edge of web 74C of angle channel 74. Plate 82 has a rear hole 82A aligned with the hole 84A in vertical journal plate 84, which is welded to the underside of the distal edge of branch 74A. Plates 82 and 84 are designed to straddle the vertical branch of angle iron 46 (FIG. 4) of stationary support 18. Consequently, channels 74 can be pivoted on the stationary support by means of a pivot provided by bolt 86.

A vertical journal plate 88 welded to a vertical branch at the end of angle iron 78 has a hole 88A that aligns with hole 82B. An axle 89 (FIG. 8) can connect between holes 88A and 82B to support end roller 90. A converging wall 92 is welded at an obtuse angle to the proximal end of web 74C.

Referring to FIG. 8, a spaced, parallel pair of journal plates 94 are welded at the corner of angle iron 78. Previously mentioned lever 44 is shown pivotally mounted between plates 94. Lever 44 is shown with a rubber sleeve 45 acting as a handle. Previously mentioned sheave 26 is shown journalled in U-shaped cradle 96, which is welded to the vertical face of angle iron 78.

Figure 11:
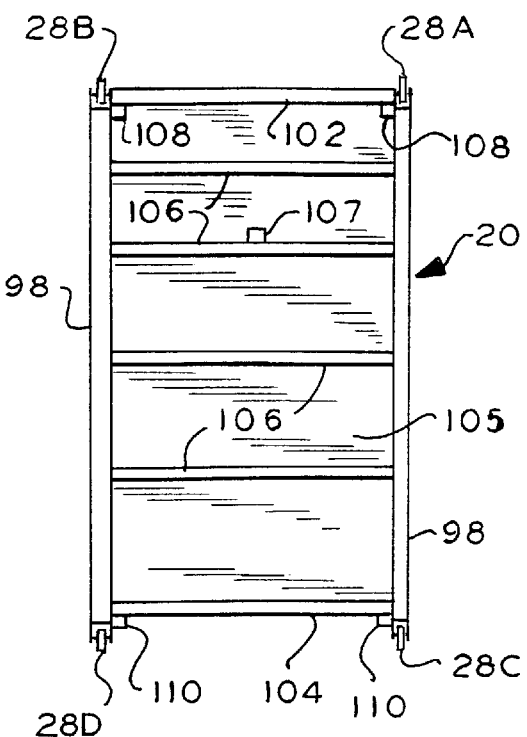
FIG. 11 is a plan view of the underside of the cargo support of FIG. 2.
Figure 12:
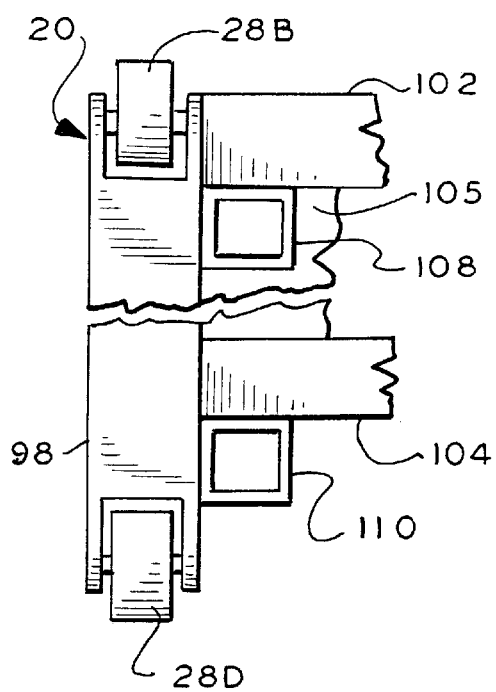
FIG. 12 is a fragmentary, detailed plan view of a side of the support of FIG. 11.

Referring to FIGS. 11 and 12, the underside of cargo support 20 is shown with a parallel pair of lateral members 98 in the form of a square tubes, each having both ends notched at their top and bottom faces to receive previously mentioned casters 28A–28D. A forward member 102, also in the form of a square tube, is welded to the ends of members 98 at their inside faces. An aft member 104, in the form of a square tube, is welded between the inside faces of members 98 near their aft ends. Members 98, 102, 104 and 106 are covered by a panel 105 made of plywood, sheet plastic or metal, or other materials.

Four, square reinforcing tubes 106 are transversely welded between opposite faces of members 98. A U-shaped hitch 107 is welded to the forward face of the second most forward one of the transverse tubes 106. The previously mentioned cable (cable 24 of FIG. 2) can be attached to hitch 107.

Two vertically oriented, short square tubes 108 are welded in the two inside corners formed between members 98 and 102 to form sockets that can hold such items as the previously mentioned fence (fence 30 of FIG. 2). Matching holes are formed in panel 105 to provide access to sockets 108 from the topside of cargo support 20. Two more vertically oriented, short square tubes 110 are welded in the two outside corners formed between members 98 and 104 to form sockets for holding other items.

Figure 13:
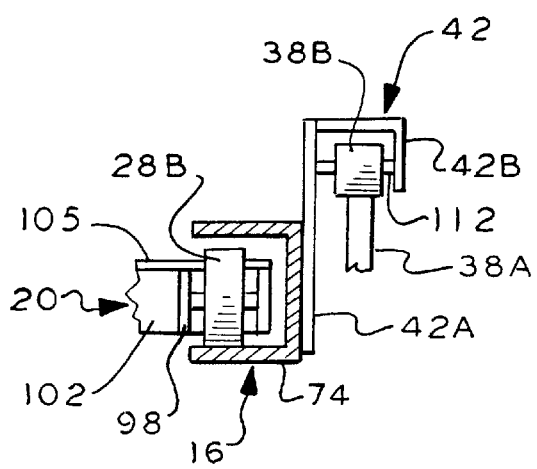
FIG. 13 is a cross-sectional view of a portion of the articulated support of FIG. 5 shown supporting the assembly of FIG. 12.

Referring to FIG. 13, cargo support 20 is shown riding inside channel 74 of articulated support 16. Previously mentioned upper joint 42 is shown composed of a vertical plate 42A welded to the outside of the web of channel 74. An angle iron 42B is welded to the top edge of plate 42A to form a journal for supporting a pin 112. Previously mentioned piston arm 38A connects to pin 112 through knuckle 38B.

Figure 14:
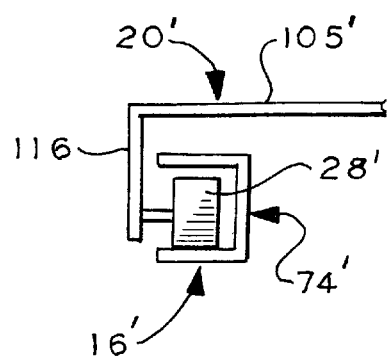
FIG. 14 is an elevational view of an assembly that is an alternate to that of FIG. 13.

Referring to FIG. 14, an alternate cargo support 20' is shown with a top panel 105' connected to a dependent skirt 116. A roller 28' is journalled on skirt 116 to roll inside channel 74' of alternate articulated support 16'. With this arrangement certain relationships are reversed. Instead of being at equal heights, cargo support 20' rides above articulated support 16'. Here, channel 74' opens to the outside instead of to the inside.

Figure 15A:
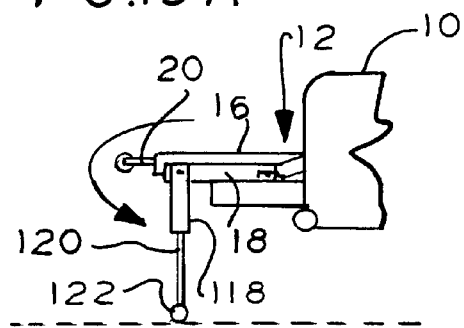
FIG. 15A–15C are sequential elevational views of the carrier of FIG. 2 showing the deployment of legs that can facilitate removal from a vehicle.

Referring to FIG. 15A, carrier 12 is shown in its normal position extending from the back of vehicle 10. Pivotally attached to each side of stationary support 18 are legs formed of telescopic members 118 and 120. The distal end of member 120 is fitted with a caster 122. Leg 118, 120 is telescopically collapsed when stored in a position parallel to stationary member 18. When deployed, leg 118, 120 is swung in the direction indicated and locked into a vertical position. Telescopic member 120 can be extended to the extent necessary to bring caster 122 against the ground.

Figure 15B:
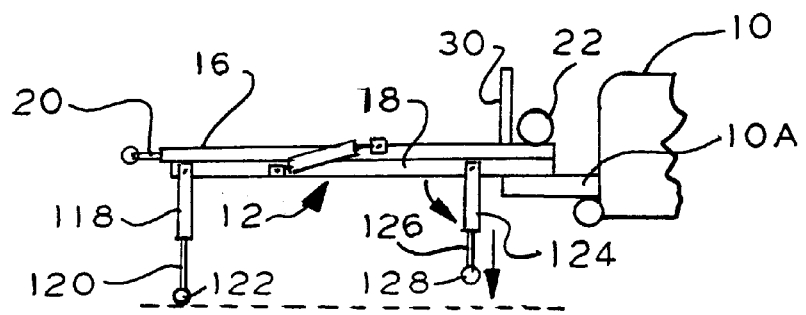
Figure 15C:
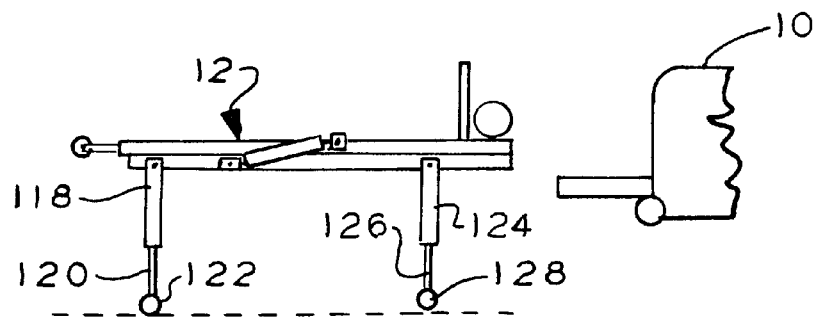

Referring to FIG. 15B, carrier 12 has been detached from vehicle 10 and retracted therefrom (by first manipulating pins 70 shown in FIG. 4). An operator can lift and pull the back end of carrier 12. Alternatively, the carrier 12 can be held in place and the vehicle 10 driven forward to partially discharge carrier 12. At this point, carrier 12 is supported on leg 118, 120 and the tail 10A. Next, a leg 124, 126 (similar to leg 118, 120) is swung as indicated to a vertical position, from a stored position parallel to stationary support 18. As before, leg members 124 and 126 are telescopically extended until caster 128 reaches the ground. At this point carrier 12 can be completely removed from vehicle 10 and supported on its legs 118–128 as shown in FIG. 15C. Therefore, carrier 12 can be wheeled on casters 122 and 128 into a garage or other storage location.

Referring to FIG. 16, an alternate stationary support 18" is attached to a vehicle. An alternate articulated support 16" is pivotally mounted on stationary support 18". The stationary support 18" is similar to the previously mentioned stationary support, except that support 18" is shortened in length and is just long enough to accommodate hydraulic cylinder 38". In the previously described embodiments the stationary support extends further but does not provide any function. Therefore the shortening of stationary support 18" is accomplished without losing any functionality.

Referring to FIG. 17, an alternate stationary support 18''' is mounted in a vehicle bed in a manner similar to that previously described. An alternate articulated support 16''' is pivotally mounted on stationary support 18'''. In this embodiment a pair of scissor arms 130 and 132 are pivotally connected at their proximal ends. The distal ends of arms 130 and 132 are pivotally attached to supports 16'41 and 18'41, respectively. An alternate hydraulic cylinder 134 is connected between arms 130 and 132 to articulate them and thereby articulate support 16'". This arrangement has the advantage that the articulated support 16'41 can descend to a position adjacent to support 18'41 and thereby lie near the vehicle bed.

FIG. 18 shows an alternate means for articulating the previously mentioned articulated support. Herein, the articulated support can be driven by a driven arm 136 pivotally mounted on journal 138, which is affixed to support 140. Lever arm 142 is integral with driven arm 136, and is pivotally attached to one end of link 144. The other end of link 144 is attached to the piston rod 146 of hydraulic cylinder 148, which is affixed to support bracket 150. Accordingly, hydraulic piston 148 can drive piston rod 146 and link 144 in the direction shown to pull lever and 142 and thereby rotate arm 136 in the direction indicated.

To facilitate an understanding of the principles associated with the foregoing apparatus, an operational sequence will now be briefly described. This operation will be described in connection with the embodiment of FIGS. 1–13, although it will be appreciated that the operation for other embodiments will be similar. It will be assumed that a motorcycle 11 has been stored atop cargo support 16 as shown in FIG. 1A. The front wheel or fork of motorcycle 11 can be attached to hitch 31 (FIG. 2) in a conventional manner. Also, motorcycle 11 can be tied down using cleats 32.

The operator can now start electrically powered hydraulic pump 51 (FIG. 3) to extend piston rod 38A. Consequently, articulated support 16 will pivot on stationary support 18, eventually rising to the position shown in FIG. 1B. Significantly, the attachment point of piston rod 38A is further from the pivot point of articulated support 16 than the attachment point of hydraulic cylinder 38. As a result, the effective lever arm for support 16 is greater than that of support 18. With this orientation, the force applied normally to stationary support 18 will be greater than that applied normally to articulated support 16. However, stationary support 18 is supported by vehicle bed 14 and is therefore better able to handle this higher force. Also, less (or none) of the weight of motorcycle 11 will be cantilevered when piston rod 38A acts at a distal position that is relatively remote from the pivot point of articulated support 16.

Figure 1C:
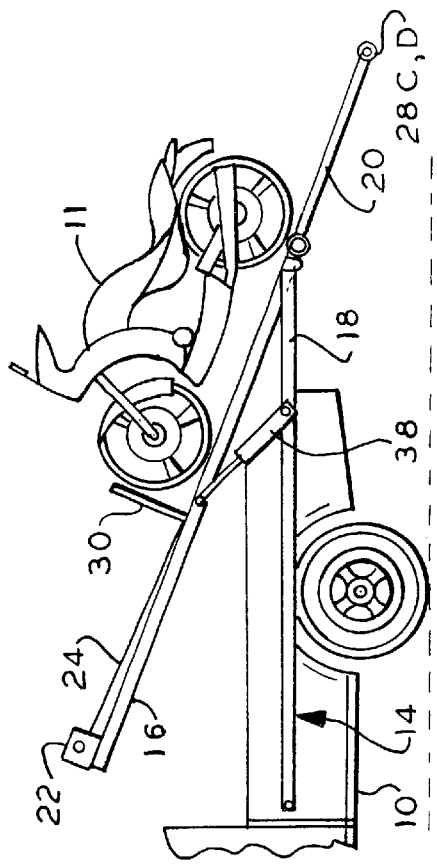
FIG. 1C shows the cargo support of the carrier of FIG. 1A partially deployed.

Next, the operator starts winch 22 and plays out cable 24 to allow cargo support 20 to descend as shown in FIG. 1C. During this descent front rollers 28A and 28B ride inside channel 74 as shown in part in FIG. 13. Also, members 98 (FIG. 11) of cargo support 20 are supported by, and roll over, rollers 90 (FIGS. 8 and 9). It will be noted that the rollers 28C, 28D are about to touch the ground before cargo support 20 can detach from articulated support 16. Thereafter, the operator can continue to play out cable 24 to deploy cargo support 20, while simultaneously reducing the force of hydraulic cylinder 38 to allow adjustments in the angle of elevation as the cargo support prepares to detach.

Figure 10A:
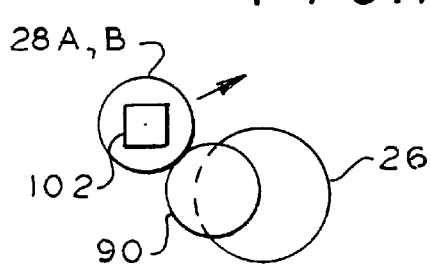
FIGS. 10A–10C are schematic diagrams showing the progression of the front end of the support of FIG. 11 over the assembly of FIG. 9.
Figure 10C:
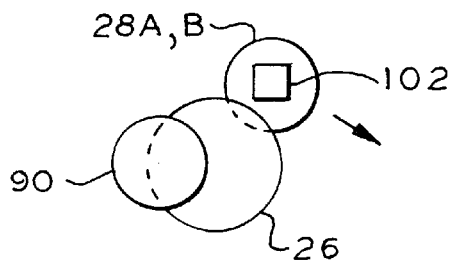
Figure 10B:
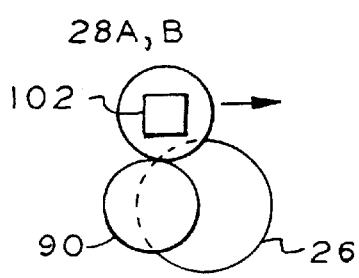

Eventually, the front end of cargo support 20 reaches the handoff location and detaches from articulated support 16, as shown in FIG. 1D. The passage through the handoff location is illustrated in FIGS. 10A–10C. Up until the moment illustrated in FIG. 10A, cargo support 20 (specifically, its members 98 of FIG. 11) were riding on and supported by rollers 90. Now the front casters 28A, 28B of the cargo support engage rollers 90 and begin to ride up as indicated in FIG. 10A. To help the front casters 28A, 28B surmount the crest of rollers 90, lever 44 (FIG. 8) may be lifted by its handle 45 to engage the underside of transverse member 102. This assistance is sometimes necessary because the cable 24 can release but cannot push cargo support 20.

Eventually as shown in FIG. 10B, front casters 28A, 28B past the crest of rollers 90, at which time a leading corner of transverse member 102 engages the crest of sheave 26. This means that transverse member 102 need not descend and ascend past a valley where it may get snagged trying to leave the valley. Accordingly, sheave 26 does not do any further lifting but allows transverse member 102 to pass and descend as shown in FIG. 10C.

Cable 24 continues to play out and now rides on sheave 26 as shown in FIG. 2. Accordingly, the forward end of cargo support 20 is eventually lowered to the ground to rest on its casters 28A–28D. Cable 24 can now be disconnected from hitch 107 (FIG. 11) and the cargo support 20 can be wheeled away on the casters 28A–28D.

As shown in FIG. 1E, new cargo has been loaded on cargo support 20, namely, a personal water craft 15. The hull of craft 15 can be centered between ribs 34 and its bow hitched to fence 30. As before, the craft can be tied down for additional security. The operator can then power winch 22 to reel in cable 24 over sheave 26 to lift the front end of cargo support 20. Cargo support 20 is guided into the channel 74 of articulated support 16 by guide plates 92 (FIGS. 2 and 7).

Eventually, transverse member 102 of cargo support 20 reaches sheave 26 and climbs to its crest, as essentially shown in FIG. 10C, but with the motion now reversed. At this time, no assistance is required from lever 44 (FIG. 8) since the cable 24 can supply sufficient force to lift cargo support 20 and surmount any impediments. Transverse member 102 passes the crest of sheave 26 and reaches the position of FIG. 10B where forward casters 28E, 28B just touch rollers 90 at their crest (not before their crest). As before, this means that casters 28A, 28B need not descend and ascend past a valley where the casters may get snagged trying to leave the valley. Instead, casters 28A, 28B arrive at the crest of rollers 90 and descend thereon to the position shown in FIG. 10A.

Figure 1B:
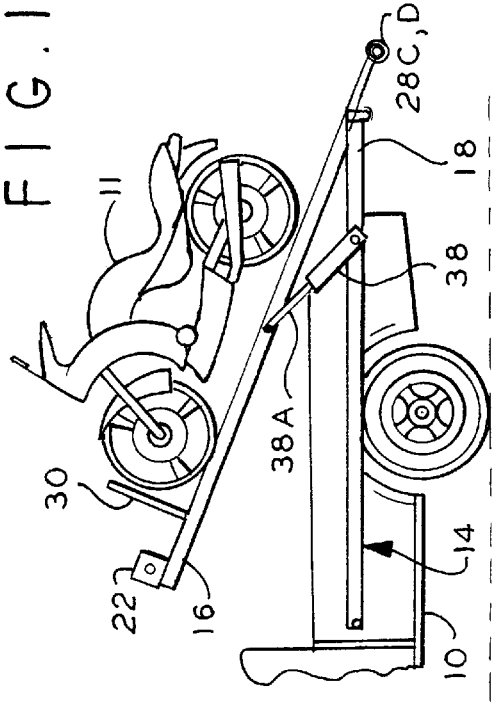
FIG. 1B shows supports of the carrier of FIG. 1A articulated.

Cargo support 20 can now reverse the procedure previously described, moving to the successive positions shown in FIG. 1C, FIG. 1B, and then FIG. 1A. When articulated support 16 fully descends against stationary support 18, the vertical arms of brackets 58 (FIG. 3) interlock between transverse member 102 and the forwardmost one of the transverse members 106 (FIG. 11) to prevent cargo support 20 from sliding off articulated support 16.

Referring to FIG. 19, the schematically illustrated, alternate cargo support 220 is designed to ride in schematically illustrated articulated support 216. In this drawing, components that are functionally similar to previously illustrated components have the same reference numeral but increased by 200. Here, the casters 228A–222E of cargo support 220 ride inside channels 274 of articulated support 216. The front and back ends of cargo support 220 are spanned by transverse shafts 302 and 304, respectively. A handoff roller 330 is rotatably mounted on shaft 302. Journal plates 282 welded to the underside of channels 274 rotatably support rollers 290. A pair of handoff rollers 226 are rotatably mounted on shaft 291, which is supported by journal plates 290.

Rollers 290 normally support the underside of members 298 as cargo support 220 rolls inside channels 274. Since shaft 304 never touches rollers 226, they have no effect until cargo support 220 is about to detach from articulated support 216. At that time, rollers 226 engage shaft 302, at the same time that roller 330 engages shaft 291. Consequently, the forward end of cargo support 220 must surmount a crest to attach or reattach to articulated support 216, but will not pass through a valley where it can become snagged.

It is appreciated that various modifications may be implemented with respect to the above described, preferred embodiments. In some embodiments the articulated support will be lifted by a single hydraulic cylinder or by more than two hydraulic cylinders. Alternatively, the articulated support may be lifted by a hoist line or by drive gears located at the pivot point. Also, the cargo support may slide along the length of the articulated support using a variety of rail systems, interconnection systems, and in some embodiments may use an endless chain to accomplish the translation. In addition, the carrier can be made from a variety of materials and can have various dimensions and shapes depending upon the specific application.

Obviously, many modifications and variations of the present invention are possible in light of the above teachings. It is therefore to be understood that within the scope of the appended claims, the invention may be practiced otherwise than as specifically described.

I claim:

1. A carrier adapted for mounting on a vehicle bed for carrying cargo, comprising:
    a bracket adapted to be mounted upon said vehicle bed;
    a stationary support adapted to be mounted on said vehicle bed and to be attached to said bracket, said stationary support being detachable from said bracket and removable from said vehicle bed without detaching said bracket from said vehicle bed;
    an articulated support having a proximal end pivotally mounted on said stationary support;
    elevation means for articulating said articulated support;
    a cargo support mounted for longitudinal motion on said articulated support, said cargo support being operable to detach and reattach to said articulated support at a handoff location located at the proximal end of said articulated support, said proximal end of said articulated support having a right and left portion for supporting the right and left edges of said cargo support, said proximal end of said articulated support having adjacent to its right and left portion a right and left pivot, respectively, for pivotal attachment to said stationary support; and
    a motive means for moving said cargo support, said motive means including:
    a guide means located at said handoff location for vertically translating and supporting an end of said cargo support from said handoff location.

2. A carrier according to claim 1 wherein said motive means comprises:
    a flexible link coupled to said cargo support; and
    a hoist means coupled to said flexible link for sliding said cargo support.

3. A carrier according to claim 2 wherein said hoist means is operable to vertically translate said cargo support when it is located beyond said handoff location.

4. A carrier according to claim 3 wherein said hoist means is mounted on said articulated support.

5. A carrier according to claim 4 wherein said hoist means comprises a winch.

6. Carrier according to claim 2 wherein said guide means comprises:
    a sheave for guiding said flexible link past said handoff location, said sheave being positioned at said handoff location to support said cargo support during detachment and reattachment with said articulated support.

7. A carrier according to claim 6 wherein said articulated support comprises at its proximal end:
    a pair of end rollers for laterally supporting said cargo support.

8. A carrier according to claim 6 wherein said articulated support comprises at its proximal end:
    at least one end roller for supporting said cargo support before its detachment and after its reattachment with said articulated support.

9. A carrier according to claim 8 wherein said cargo support is operable during reattachment to re-engage said sheave and said at least one roller and crest upon them contemporaneously.

10. A carrier according to claim 9 wherein said cargo support comprises:
    a spaced, parallel pair of lateral members; and
    a forward and an aft member, each connected between said lateral members, said sheave supporting said forward member during detachment and during reattachment with said articulated support.

11. A carrier according to claim 10 wherein said at least one end roller comprises a pair of rollers attached to opposite sides of said articulated support at the proximal end in a position to support said lateral members.

12. A carrier according to claim 1 wherein said elevation means is coupled to said articulated support at an upper joint and to said stationary support at a lower joint, said upper joint being further from said proximal end than said lower joint.

13. A carrier according to claim 12 wherein said stationary support is adapted to be mounted flat against said vehicle bed, said lower joint being adapted to be supported by said vehicle bed.

14. A carrier according to claim 13 wherein said upper joint and said lower joint are positioned to allow said articulated support to descend to a position contiguous to said stationary support.

15. A carrier according to claim 14 wherein said elevation means comprises a hydraulic cylinder.

16. A carrier according to claim 14 wherein said elevation means comprises a hydraulic cylinder positioned to retract and descend to an elevational angle of less than 10° with respect to said stationary support.

17. A carrier according to claim 1 wherein said stationary support is adapted to lay flat on the vehicle bed and adapted to be cantilevered beyond the vehicle bed.

18. A carrier according to claim 1 wherein said articulated support comprises:
    a longitudinally extending pair of C-shaped channels, said cargo support being slidably mounted in said channels.

19. A carrier according to claim 18;
    a pair of converging walls each attached laterally at said proximal end of a corresponding one of said channels.

20. A carrier according to claim 1 comprising:
    lift means for translating said cargo support during and immediately after its detachment with said articulated support.

21. A carrier according to claim 20 wherein said lift means comprises:
    a lever mounted at said handoff location for swinging back and urging said cargo support past said guide means.

22. A carrier according to claim 1 wherein said cargo support is retractable to a fully retracted position in said articulated support, said cargo support in said fully retracted position being cantilevered from said articulated support past the handoff location.

23. A carrier according to claim 22 wherein said cargo support has a fully retracted position, said cargo support having a plurality of support casters, at least two of them being positioned beyond said handoff location upon said cargo support reaching said fully retracted position.

24. A carrier according to claim 1 comprising:
an interlock means operable between said stationary support and said cargo support for preventing longitudinal extension of said cargo support after it fully descends in a fully retracted position.

25. A carrier according to claim 1 comprising:
a plurality of legs mounted on said stationary support to deploy to an upright position and support said stationary support upon removal from said vehicle bed.

26. A carrier according to claim 25 wherein each of said plurality of legs comprise:
a distal caster, each of said legs being telescopically extensible and elevationally rotatable.

27. A carrier according to claim 26 comprising:
at least one pin, said bracket having at least one bracket hole sized to receive said at least one pin, said stationary support having at least one support hole adapted to be aligned with said at least one bracket hole, said pin being sized to connect into said bracket hole and said support hole in order to attach said stationary support to said bracket.

28. A carrier adapted for mounting on a vehicle bed for carrying cargo, comprising:
a stationary support adapted to be mounted on said vehicle bed;
an articulated support having a proximal end pivotally mounted on said stationary support;
elevation means coupled to said articulated support at an upper joint and to said stationary support at a lower joint for articulating said articulated support, said upper joint being further from said proximal end than said lower joint;
a cargo support mounted for longitudinal motion on said articulated support, said cargo support being operable to detach and reattach to said articulated support at a handoff location located at the proximal end of said articulated support; and
a motive means for moving said cargo support, said proximal end of said articulated support having a right and left portion for supporting the right and left edges of said cargo support, said proximal end of said articulated support having adjacent to its right and left portion a right and left pivot shaft, respectively, for pivotal attachment to said stationary support.

29. A carrier according to claim 28 wherein said stationary support is adapted to be mounted flat against said vehicle bed, said lower joint being adapted to be supported by said vehicle bed.

30. A carrier according to claim 29 wherein said upper joint and said lower joint are positioned to allow said articulated support to descend to a position contiguous to said stationary support.

31. A carrier according to claim 30 wherein said elevation means comprises a hydraulic cylinder.

32. A carrier according to claim 30 wherein said elevation means comprises a hydraulic cylinder positioned to retract and descend to an elevational angle of less than 10° with respect to said stationary support.

* * * * *